US006959400B2

(12) United States Patent
Peleska

(10) Patent No.: US 6,959,400 B2
(45) Date of Patent: Oct. 25, 2005

(54) SYSTEM AND METHOD FOR ESTABLISHING CONSISTENT MEMORY CONTENTS IN REDUNDANT SYSTEMS

(75) Inventor: Pavel Peleska, Graefelfing (DE)

(73) Assignee: Siemens Aktiengesellschaft, Munich (DE)

( * ) Notice: Subject to any disclaimer, the term of this patent is extended or adjusted under 35 U.S.C. 154(b) by 492 days.

(21) Appl. No.: 10/166,722

(22) Filed: Jun. 12, 2002

(65) Prior Publication Data

US 2003/0041220 A1    Feb. 27, 2003

(30) Foreign Application Priority Data

Aug. 23, 2001 (EP) ................................ 01120 254

(51) Int. Cl.[7] ............................................ G06F 11/00
(52) U.S. Cl. ........................................................ 714/6
(58) Field of Search ............................................ 714/6

(56) References Cited

U.S. PATENT DOCUMENTS

| | | | | |
|---|---|---|---|---|
| 5,615,329 A | * | 3/1997 | Kern et al. ..................... | 714/6 |
| 5,951,695 A | * | 9/1999 | Kolovson ..................... | 714/16 |
| 6,728,898 B2 | * | 4/2004 | Tremblay et al. ............... | 714/6 |
| 6,732,125 B1 | * | 5/2004 | Autrey et al. .................. | 707/24 |
| 2003/0177307 A1 | * | 9/2003 | Lewalski-Brechter ....... | 711/114 |
| 2003/0217119 A1 | * | 11/2003 | Raman et al. .............. | 709/219 |

* cited by examiner

Primary Examiner—Bryce P. Bonzo
(74) Attorney, Agent, or Firm—Morrison & Foerster LLP

(57) ABSTRACT

In a fault-tolerant system which is constructed from two identical control devices, there is a requirement to establish consistent memory contents in both devices in order to guarantee uninterrupted operation in the event of a hardware defect in one of the two control devices. To this end, the memory contents are transferred from an active control device to an inactive control device. In this situation, the active control device remains in operation and the contents of the memory of the active control device can be continually updated. According to the invention, the transfer of the memory contents is performed by a copying device, whereby the copying device manages the memory areas of the memory of the active control device which are to be transferred and which are possibly changing by means of a memory monitoring module and a marking memory.

17 Claims, 1 Drawing Sheet

SYSTEM AND METHOD FOR ESTABLISHING CONSISTENT MEMORY CONTENTS IN REDUNDANT SYSTEMS

CLAIM FOR PRIORITY

This application claims the benefit of priority from German Application No. 01120254.6 filed Aug. 23, 2001.

TECHNICAL FIELD OF THE INVENTION

The invention relates to a system and method for establishing consistent memory contents in redundant systems.

BACKGROUND OF THE INVENTION

In a fault-tolerant system which is constructed from two identical control devices, there is a requirement to establish consistent, i.e. identical, memory contents in both devices in order to guarantee uninterrupted operation in the event of a hardware defect in one of the two control devices. To this end, the memory contents must be transferred from the active control device to the inactive control device. In this situation, the active control device remains in operation and the contents of the memory of the active control device can be continually updated.

Until now, a hardware-based method or a software-based method has been used as a solution to this problem. With regard to the hardware-based method, all the data which is written to the memory of the active control device is transferred by way of an interface from the active control device to the inactive control device. To achieve this, it is necessary to sample the data externally on the memory interface of the active control device or internally in the north bridge of the active control device and forward it to the interface with the inactive control device.

Sampling and forwarding must either be able to occur quickly such that no data is lost, i.e. the bandwidth of the interface with the inactive control device must be at least as high as that of the memory interface, or there must be a capability to reduce the speed at which new data is written to the memory of the active control device, the speed of the CPU therefore, such that no loss of data results.

The following problems are encountered with the known hardware-based method:
  The processing speed of the CPU is reduced as a result of the slowing down of the write data rate of the CPU.
  In order to slow down the CPU, control of the CPU from the hardware side and thus access to the CPU bus are required. Access to the CPU bus may be undesirable or even impossible if, for example, the functionality of the north bridge is integrated in the CPU—a situation which will be encountered more frequently in future.
  If the sampling of the write data takes place in the north bridge, as a rule, no conventional north bridge can be used. The development effort for a special north bridge which is then required is considerable.

With regard to the software-based method, memory area tables are used for the CPU, and in that situation particularly the dirty bit which indicates whether write access has been made to a memory area. A task which is running in the background periodically checks the entries in the memory area tables and initiates the copying of memory areas to which write access has been made, i.e. their associated dirty bit is set.

The following problems are encountered with the known software-based method:

The background task which evaluates the entries in the memory area tables consumes CPU power.
  It is necessary to ensure that the dirty bits can be utilized. Modem operating systems use the memory management unit of the CPU, which is responsible for management of the memory with the assistance of the memory area tables, and frequently manipulate the memory area tables during the process. The software-based method functions if the operating system does not use the memory management unit of the CPU, or is designed such that the method is supported directly by the operating system.

SUMMARY OF THE INVENTION

In one embodiment of the invention, consistent memory contents are established and carried out with the aid of simple devices such as a memory monitoring module, a copying device, and a marking memo, and is controlled by the copying device. No specially produced north bridge is therefore required for sampling the memory contents. Additionally, it is not necessary to slow down the write data rate and thus the processing speed of the CPU since the data to be transferred is not sampled directly by the CPU but is read from the memory. The link which is used for transferring the memory contents to the inactive control device can have a smaller bandwidth than the memory interface between CPU and memory. The method works independently of the dirty bits in the memory area tables of the CPU—MMU, Memory Management Unit—whereby new dirty bits are formed in the marking memory. This is advantageous because the use of operating systems is not subject to any restrictions regarding memory management and that no adaptation of the operating system is required. Furthermore, control of the method being effected by the copying device ensures that no CPU power is consumed for establishing consistent memory contents.

In one aspect of the invention, information concerning memory areas which are to be omitted during the transfer to the inactive system is additionally stored in the marking memory in which the dirty bits that indicate a write access to the memory area in question are stored. The advantage in this situation is that memory areas which are frequently modified do not include any required information which does not impede convergence of the method.

BRIEF DESCRIPTION OF THE DRAWINGS

The invention will be described below, with reference to the drawings.

DETAILED DESCRIPTION OF THE PREFERRED EMBODIMENTS

Figure 1:
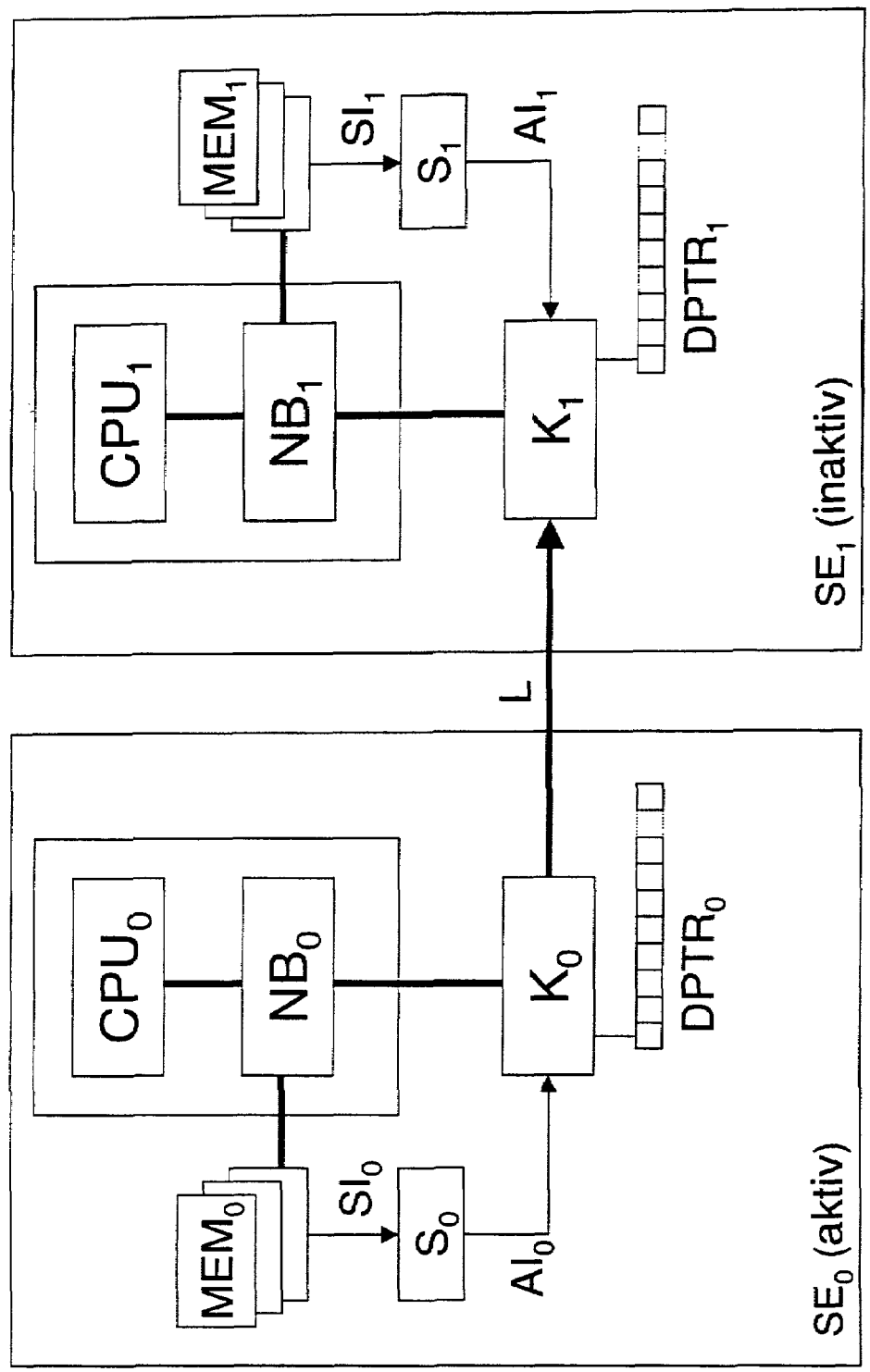
FIG. 1 shoes an active control unit and an inactive control unit of a fault-tolerant system.

FIG. 1 shows an active control unit $SE_o$ and an inactive control unit $SE_1$ of a fault-tolerant system. Both control units $SE_o$ and $SE_1$ are of similarly constructed and each include a processing unit $CPU_o$, $CPU_1$, an interface unit or north bridge $NB_o$, $NB_1$, and a memory $MEM_0$, $MEM_1$. The functionality of the processing units $CPU_o$, $CPU_1$, and of the north bridges $NB_o$, $NB_1$, can, as shown, be implemented in two separate devices, or combined in a single device, which is not shown.

In addition, for each of the two control devices $SE_o$, SE, FIG. 1 shows a copying device $K_o$, $K_1$, each having a connected marking memory, or dirty page tag RAM DPTR$_o$, DPTR$_1$ and a memory monitoring module, or snooper S$_o$, S$_1$. In a first embodiment, this is used in order to synchronize the contents of the memory MEM$_o$ of the active control device SE$_o$ with the memory MEM$_1$ of the inactive control device SE$_1$ for the first time, for example following the replacement of a hardware unit belonging to the inactive control device SE$_1$. After memory contents have been established, the inactive control device SE$_1$ is also activated. Both control devices then operate in synchronism, whereby the synchronous operation of the memory contents of the two control devices is monitored.

The snooper S$_o$ of the active control device SE$_o$ observes the accesses of the north bridge NB$_o$ of the active control device SE$_o$ to the memory MEM$_o$ of the active control device SE$_o$. To this end, the snooper S$_o$ of the active control device SE$_o$ is connected to the control lines of the memory interface SI$_o$ of the active control device SE$_o$, which provides information concerning whether, for example, a write cycle, a read cycle or a refresh cycle is taking place. Write cycles are of significance to the snooper So of the active control device SE$_o$. The snooper S$_o$ of the active control device SE$_o$ is additionally connected to the address lines and control lines of the memory interface SI$_o$ of the active control device SE$_o$ such that it is possible to determine by means of the snooper S$_o$ of the active control device SE$_o$ on which memory area a write access is taking place.

This information, i.e. the memory address to which a write access is being performed is transferred by the snooper So of the active control device SE$_o$ as address information AI by way of an interface to a copying device K$_o$ of the active control device SE$_o$, which evaluates this information. With regard to this copying device K$_o$ of the active control device SE$_o$, this is preferably a field programmable gate array FPGA or an application specific integrated circuit ASIC. However, it is also possible to implement the function of the copying device K$_o$ of the active control device SE$_o$ in a program-controlled fashion by using a micro-controller.

The copying device K$_o$ of the active control device SE$_o$ monitors the memory areas managed by it of the memory MEMO of the active control device SE$_o$ for modifications and to read any modified contents and to send them by way of a link L to the copying device K$_1$ of the inactive control device SE. The copying devices K$_o$, K$_1$ are advantageously connected in one embodiment via a standard interface—e.g. PCI bus or AGP bus—to the north bridges NB$_o$, NB$_1$.

The copying device K$_o$ of the active control device SE$_o$ is connected to a dirty page tag RAM DPTP$_o$ of the active control device SE$_o$. An associated bit exists in the dirty page tag RAM DPTR$_o$ of the active control device SE$_o$ for each memory area of the memory MEM$_o$ of the active control device SE$_o$. The bit assigned to a memory area in the dirty page tag RAM DPTR$_o$ of the active control device SE$_o$ is set by the copying device K$_o$ of the active control device SE$_o$ if a write access has been performed to the corresponding memory area. This causes the corresponding memory area to be identified as modified "dirty".

The number of memory areas into which the memory MEM of the active control device SE$_o$ is divided and the size of the particular memory area which is managed by a respective bit in the dirty page tag RAM DPTR$_o$ of the active control device SE$_o$ do not necessarily play a significant role in this situation for the method according to the invention. The memory areas can be equal in size or can have different sizes.

When a bit has been set in the dirty page tag RAM DPTR$_o$ of the active control device SE$_o$, it is not buffered by the snooper So of the active control device SE$_o$. In other words, write accesses to an address or an address range is registered by the snooper So of the active control device SE$_o$ and signaled to the copying device K$_o$ of the active control device SE$_o$ irrespective of whether the corresponding memory area has already been marked as modified by the corresponding bit set in the dirty page tag RAM DPTR$_o$ of the active control device SE$_o$.

When the operation to carry out the first synchronization of the memory contents of the active control device SE$_o$ and the inactive control device SE$_1$ is initiated, the copying device K$_o$ of the active control device SE$_o$ utilizes the dirty page tag RAM DPTR$_o$ of the active control device SE$_o$, e.g. beginning at the first bit of the dirty page tag RAM DPTR$_o$ of the active control device SE$_o$, to check whether the corresponding memory area has been modified. If this is the case, the corresponding bit in the dirty page tag RAM DPTR$_o$ of the active control device SE$_o$ is reset, and the copying device K$_o$ of the active control device SE$_o$ reads the memory area, identified as modified by this bit, of the memory MEMO of the active control device SE$_o$ and transfers the memory contents by way of the link L to the copying device K$_1$ of the inactive control device SE$_1$.

The copying device K$_1$ of the inactive control device SE$_1$ transfers the received data to the memory MEM$_1$ of the inactive control device SE$_1$. In this situation, the data is stored by the copying device K$_1$ of the inactive control device SE$_1$ at the address in the memory MEM$_1$ of the inactive control device SE$_1$ at which it is also stored in the memory MEM$_o$ of the active control device SE$_o$. The copying operation takes place in the background concurrently with the activity of the processing unit CPU$_o$ such that memory areas can be modified again until the copying device K$_o$ of the active control device SE$_o$ has processed the memory areas identified by the corresponding bits of the dirty page tag RAM DPTR$_o$ of the active control device SE$_o$.

If write access is performed to memory areas which have already been transferred while the operation is running to effect the first synchronization of the memory contents, the associated bits are set again in the dirty page tag RAM DPTR$_o$ of the active control device SE$_o$, as a result of which these memory areas are again identified as modified. If the memory area currently being copied is also affected by this, the copying operation in progress can be continued or aborted in this situation.

After the copying operation for a memory area has been successfully completed or has been aborted because of modifications occurring in the interim, the next bit in the dirty page tag RAM DPTR$_o$ of the active control device SE$_o$ is checked by the copying device K$_o$ of the active control device SE$_o$. If this is set, the relevant bit in the dirty page tag RAM DPTR$_o$ of the active control device SE$_o$ is reset and the corresponding memory area is likewise copied from the memory MEM$_o$ of the active control device SE$_o$ into the memory MEM$_1$ of the inactive control device SE.

Checking of the dirty page tag RAM DPTR$_o$ of the active control device SE$_o$ is performed for each individual bit. On reaching the last bit in the dirty page tag RAM DPTR$_o$ of the active control device SE$_o$, the operation is started again for the first bit by the copying device K$_o$ of the active control device SE$_o$.

A counter for the number of memory areas not yet copied or modified is present in the copying device K$_o$ of the active control device SE$_o$. When the count reaches or fails to reach a pre-defined value, the processing unit CPU$_o$ is briefly prevented from performing further write transactions in the memory MEMO of the active control device SE$_o$, for example by an interrupt triggered by the copying device $K_o$, with a corresponding interrupt handling routine. During this time, the remaining modified memory areas of the active control device $SE_o$ are copied to the inactive control device SE by the copying device $K_o$.

The memory areas identified by corresponding bits in the dirty page tag RAM $DPTR_o$ of the active control device $SE_o$ are transferred from the active control device $SE_o$ to the inactive control device $SE_1$. With that, the method according to the first embodiment of the present invention is completed, the control device $SE_1$ can be activated and both control devices $SE_o$ and SE can continue to operate synchronously.

The convergence of the method, i.e. the speed at which the number of memory areas not yet copied reduces, depends heavily on the application software running on the processing unit $CPU_o$ of the active control device $SE_o$, in particular on the locality and frequency of the write memory accesses. Generally speaking, write accesses made by an application have a restricted local effect. However, the nature of an application may be such that it modifies memory areas over extended periods of time or without interruption more quickly than these can be copied by copying device $K_o$ of the active control device $SE_o$. In this case, the application software is slowed down in order to force convergence. This can be done in an advantageous embodiment, for example, by an interrupt triggered by the copying device $K_o$ of the active control device $SE_o$ with a corresponding interrupt handling routine, as a result of which the processing unit $CPU_o$ of the active control device $SE_o$ is increasingly slowed down further but without any intervention in the actual application software.

In an advantageous embodiment of the invention, the dirty page tag RAM $DPFR_o$ for each memory area can include a further bit which is set in order to indicate to the copying device $K_o$ whether the memory area is to be synchronized. If a memory area is not to be synchronized, the associated bit in the dirty page tag RAM $DPTR_o$ is ignored by the copying device $K_o$. This is appropriate for memory areas where it is known that these are frequently modified but do not include any important or required information.

The invention is not restricted to the embodiment. For example, the method can likewise be used in order to continually add changes made in a memory $MEM_o$ of an active control device $SE_o$ to a memory $MEM_1$ of an inactive control device $SE_1$ with the objective that, in the event of failure of the active control device $SE_o$, operation can be continued by the inactive control device $SE_1$ with the relevant current memory contents.

To this end, the method described above is adapted to the effect that the checking of the dirty page tag RAM $DPTR_o$ of the active control device $SE_o$ is carried out continually and that there no interruption of the processing unit $CPU_o$ occurs if a particular counter value is not reached for the number of memory areas not yet copied or modified.

The dirty page tag RAM $DPTR_o$ of the active control device $SE_o$ can advantageously include a further bit for each memory area which is set in order to indicate to the copying device $K_o$ of the active control device $SE_o$ whether the memory area is to be synchronized—not shown.

Advantageously, an interruption can be provided between two complete checks of the dirty page tag RAM $DPTR_o$ of the active control device $SE_o$, for example in order to prevent excessive loading of the memory interface by the copying device $K_o$ of the active control device $SE_o$.

What is claimed is:

1. A method for establishing consistent memory contents in a redundant system, having
    an active control unit and an inactive control unit, each having a processing unit with an interface unit and a memory, comprising:
    monitoring the memory of the active control unit by a memory monitoring module of the active control unit, the memory having address information relating to memory areas to which a write access has been performed and which is forwarded by the memory monitoring module of the active control unit to a copying device of the active control unit;
    synchronizing the address information supplied by the memory monitoring module of the active control unit by the copying device of the active control unit with a marking memory of the active control unit, in which the memory areas to which a write access has been performed are entered;
    sending data from the memory areas entered in the marking memory of the active control unit by the copying device of the active control unit by a link to the copying device of the inactive control unit, whereby corresponding bits are reset in the marking memory of the active control unit;
    storing the data received by the copying device of the inactive control device by the link at the address in the memory of the inactive control device at the same address stored in the memory of the active control device; and
    providing an interruption between two complete checks of the marking memory of the active control unit and the transfer of data to the memory of the inactive control device.

2. The method according to claim 1, wherein one or more bits are used in the memory area in the marking memory of the active control unit for marking the memory area as having been modified by a write access.

3. The method according to claim 2, wherein at least one additional bit is used per memory area in the marking memory of the active control unit for marking the memory area as omitted during transfer to the memory of the inactive control device.

4. The method according to claim 1, wherein the method is executed until the memory areas of the memory of the active control device which have been modified by a write access have been transferred to the memory of the inactive control device.

5. The method according to claim 4, further comprising:
    entering a number of remaining memory areas of the memory of the active control device which have been modified by a write access; and
    defining a limit value for the number such that when the number fails to reach the value, additional write accesses to the memory of the active control device are prevented until the remaining memory areas of the memory of the active control device which have been modified by the write access have been transferred to the memory of the inactive control device.

6. The method according to claim 1, wherein at least one of a field programmable gate array, an application specific integrated circuit or a micro-controller is provided for each of the copying devices, and
    the connection of the copying devices to the interface unit including a memory interface or to the CPU with an integrated interface unit is implemented by a PCI bus system or by an AGP bus system.

7. A copying device of a redundant system, comprising:
a first device to read data from a memory of a control device;
a second device to write the data to the memory of the control device;
a third device to receive address information about memory areas to which a write access has been performed;
a fourth device to synchronize the address information with a marking memory having memory areas storing information to which a write access has been performed, by sending data from the memory areas of the memory which are entered in the marking memory and the address information of the data to a first copying device;
a fifth device to receive the data and the address information of the data from a second copying device; and
a sixth device to enter the data in the memory of the control device in accordance with the address information received.

8. The copying device according to claim 7, wherein the copying device is at least one of a field programmable gate array, an application specific integrated circuit or a micro-controller, and
the copying device is connected by one of a PCI bus system or by an AGP bus system to the interface unit including the memory interface or to a CPU with an integrated interface unit.

9. The copying device according to claim 7, wherein the copying device includes a memory monitoring module with a first unit to monitor the memory interface of the memory and a second unit to provide address information about the memory areas to which a write access has been performed, and the marking memory in which the memory areas to which a write access has been performed are entered.

10. A method for establishing consistent memory contents in a redundant system, having an active control unit and an inactive control unit, each having a processing unit with an interface unit and a memory, comprising:
monitoring the memory of the active control unit by a memory monitoring module of the active control unit, the memory having address information relating to memory areas to which a write access has been performed and which is forwarded by the memory monitoring module of the active control unit to a copying device of the active control unit;
synchronizing the address information supplied by the memory monitoring module of the active control unit by the copying device of the active control unit with a marking memory of the active control unit, in which the memory areas to which a write access has been performed are entered;
sending data from the memory areas entered in the marking memory of the active control unit by the copying device of the active control unit by a link to the copying device of the inactive control unit, whereby corresponding bits are reset in the marking memory of the active control unit;
storing the data received by the copying device of the inactive control device by the link at the address in the memory of the inactive control device at the same address stored in the memory of the active control device;
entering a number of remaining memory areas of the memory of the active control device which have been modified by a write access; and
defining a limit value for the number such that when the number fails to reach the value, additional write accesses to the memory of the active control device are prevented until the remaining memory areas of the memory of the active control device which have been modified by the write access have been transferred to the memory of the inactive control device,
wherein the method is executed until the memory areas of the memory of the active control device which have been modified by a write access have been transferred to the memory of the inactive control device.

11. The method according to claim 10, wherein one or more bits are used in the memory area in the marking memory of the active control unit for marking the memory area as having been modified by a write access.

12. The method according to claim 11, wherein at least one additional bit is used per memory area in the marking memory of the active control unit for marking the memory area as omitted during transfer to the memory of the inactive control device.

13. The method according to claim 10, wherein at least one of a field programmable gate array, an application specific integrated circuit or a micro-controller is provided for each of the copying devices, and
the connection of the copying devices to the interface unit including a memory interface or to the CPU with an integrated interface unit is implemented by a PCI bus system or by an AGP bus system.

14. A system for establishing consistent memory contents in a redundant system, comprising:
an active control unit and an inactive control unit, each having a processing unit with an interface unit and a memory, wherein
the memory of the active control unit is monitored by a memory monitoring module of the active control unit, the memory having address information relating to memory areas to which a write access has been performed and which is forwarded by the memory monitoring module of the active control unit to a copying device of the active control unit,
the address information supplied by the memory monitoring module of the active control unit is synchronized by the copying device of the active control unit with a marking memory of the active control unit, in which the memory areas to which a write access has been performed are entered,
data from the memory areas entered in the marking memory of the active control unit is sent by the copying device of the active control unit by a link to the copying device of the inactive control unit, whereby corresponding bits are reset in the marking memory of the active control unit, and
the data received by the copying device of the inactive control device by the link is stored at the address in the memory of the inactive control device at the same address stored in the memory of the active control device.

15. The system according to claim 14, wherein at least one of a field programmable gate array, an application specific integrated circuit or a micro-controller is provided for each of the copying devices, and
the connection of the copying devices to the interface unit including a memory interface or to the CPU with an integrated interface unit is implemented by a PCI bus system or by an AGP bus system.

16. A system in a redundant system, comprising:
a first device to read data from a memory of a control device;
a second device to write the data to the memory of the control device;
a third device to receive address information about memory areas to which a write access has been performed;
a fourth device to synchronize the address information with a marking memory having memory areas storing information to which a write access has been performed, by sending data from the memory areas of the memory which are entered in the marking memory and the address information of the data to a first copying device;
a fifth device to receive the data and the address information of the data from a second copying device; and
a sixth device to enter the data in the memory of the control device in accordance with the address information received.

17. The system according to claim 16, wherein at least one of a field programmable gate array, an application specific integrated circuit or a micro-controller is provided for each of the copying devices, and
the connection of the copying devices to the interface unit including a memory interface or to the CPU with an integrated interface unit is implemented by a PCI bus system or by an AGP bus system.

* * * * *